Oct. 29, 1929.  A. HOVDE  1,733,224
BRAKE TESTING DEVICE FOR VEHICLE WHEELS
Filed Feb. 16, 1923  2 Sheets-Sheet 1

Inventor
Albert Hovde
By
Pennie, Davis, Marvin & Edmonds
Attorneys

Oct. 29, 1929.                A. HOVDE                1,733,224
               BRAKE TESTING DEVICE FOR VEHICLE WHEELS
                  Filed Feb. 16, 1923        2 Sheets-Sheet 2
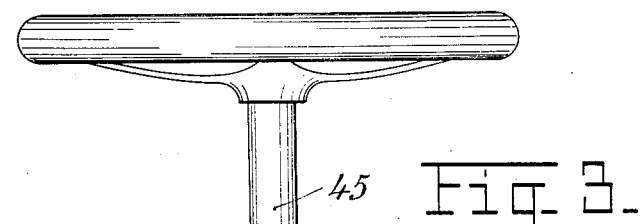
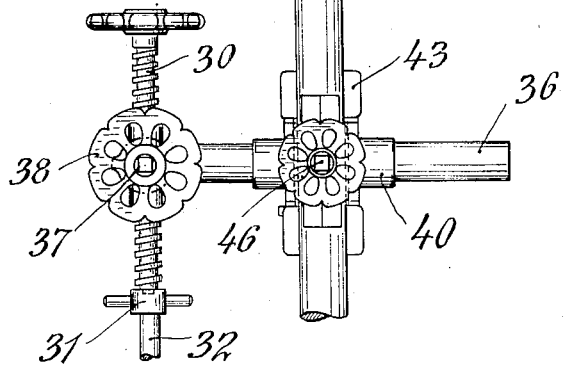
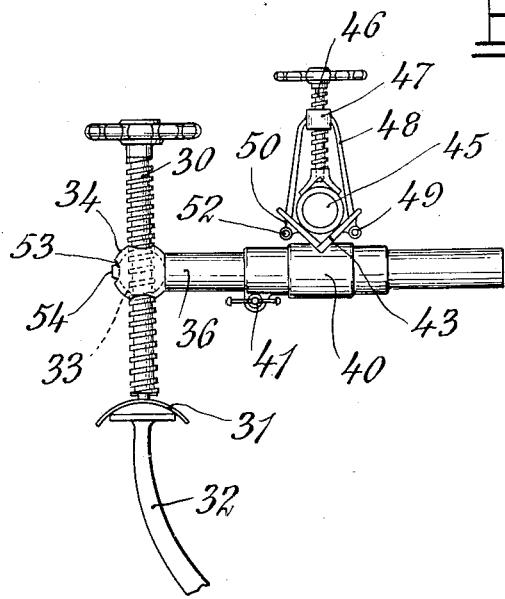

Patented Oct. 29, 1929

1,733,224

UNITED STATES PATENT OFFICE

ALBERT HOVDE, OF NOTTEROY, NORWAY

BRAKE-TESTING DEVICE FOR VEHICLE WHEELS

Application filed February 16, 1928, Serial No. 254,711, and in Norway February 25, 1927.

Brake-testing devices are already known, comprising a plurality of pivotally connected members, certain of which have grapple-acting ends engageable with the exterior of a wheel tire and adapted to be drawn onto the tire by movement of one or the other of said members. It is also known in connection with said device to use a scale to indicate the force exerted to rotate the wheel to which the device is applied.

The present invention is characterized substantially by an arrangement wherein one of the connected members engages the exterior of the wheel tire at one point and wherein one of the other members engages the shaft or the hub of the wheel, so as to be located in an exact position whereby the force indicator will always remain at the same distance from the wheel centre when the apparatus is in position on the wheel and the latter is rotated against the action of the brake.

My invention also relates to a certain device for mechanical depression of the brake lever or pedal in order to be able to maintain the braking power at a constant value during the testing operation.

The invention consists of the features hereinafter set forth and shown in the drawings.

Fig. 1 is a partial elevation.

Fig. 2 is a partial plan view.

Fig. 3 and Fig. 4 show the brake depressing device seen from two different sides.

The testing device comprises an arm 1 provided at the inner end with a ring or the like 2, which engages the shaft or the hub 3 of the wheel. To the inner part of this arm 1 is by means of a pin 4 pivoted an arm 6, the free end of which is provided with a curved grapple or shoe 8 engageable with the exterior of the wheel 10.

To the inner part of the arm 1 is further pivoted a hand lever 12 with a handle 11. At the outer part of said hand lever is pivoted a force indicator comprising a vertically upstanding tube 13 or the like, provided with a slot 14, through which projects the arm 1. The arm 1 is depressed by a spring 16 located in the tube 13. The end of the arm 1 which projects beyond the tube 13 is provided with pointers 18 moving over indexes 19 on both sides of the tube 13 to indicate the degree of compression of the spring and thus the force exerted to turn the wheel. The arm of the grapple 8 may preferably consist of two telescopically fitting members 6 and 22. These members are locked longitudinally relatively to one another by means of a screw 20 engaging a circumferential groove 21 at the inner end of member 22 in such a manner, that the latter and thus the grapple 8 can be rotated in the tube 6 to enable the grapple to fit to the wheel on either side of the car.

As the grapple arm is pivoted excentrically to the centre of the wheel 10 the length of said arm will suit wheels of different diameters. In order to further adapt the grapple arm to the wheel, the arm 1 is provided with a series of holes 25 into which the pivot for the grapple arm may be shifted.

The hand lever 12 is provided with a cushion 26 of rubber to prevent injury on the paint of the mudguard or other parts of the car.

During the use of the brake testing device the brake is depressed and maintained in a braking position by means of the device shown in Fig. 3 and Fig. 4. This device consists in a screw 30 provided with a handwheel and the free end of which is turnably connected to a curved plate 31 adapted to rest upon the brake pedal 32. The screw is threaded into a ball 33 turnably mounted in a spherical socket 34 arranged on a horizontal bar 36. The ball 33 can be locked relatively to the spheric socket 34 by means of a screw 37 provided with a handwheel 38. The horizontal bar 36 is mounted so as to be longitudinally adjustable in a sleeve 40 split at one of its ends. This sleeve can be locked to the bar by means of a clamping screw 41. The sleeve 40 is on its side provided with an angular piece 43, which serves as a rest for the steering rod 45 to which the apparatus is attached by means of a screw 46 with handwheel threaded into a nut 47 carried by a holder 48, which is turnably connected with the angular piece 43 by a pin 49. The other end of the holder 48 is provided with a lug 50 pivoted to a corresponding lug on the angular piece 43 by means of a pin 52.

The spherical socket 34 is provided on three of its sides with outcuts, two of which are located on opposite sides and intended for the passage of the screw 30 and the third outcut serving as a guiding extension on the nut 33.

Claims:

1. A brake testing device for vehicle wheels comprising an arm, a part of said arm being adapted to engage the shaft or hub of the wheel so as to fix said arm at a definite radial position on the wheel, a gripping member pivotally connected to the arm and comprising two elongated parts rotatably movable but longitudinally immovable relatively to one another, a hand lever also pivotally connected to the arm, and a force indicator operatively connecting the arm and the lever and adapted to transmit from lever to arm a force observable on the indicator.

2. A brake testing device for vehicle wheels comprising an arm, a part of said arm being adapted to engage the shaft or hub of the wheel so as to fix said arm at a definite radial position on the wheel, a gripping member pivotally connected to the arm and comprising telescopically jointed elongated sections rotatably movable but longitudinally immovable relatively to one another, a hand lever also pivotally connected to the arm, and a force indicator operatively connecting the arm and the lever and adapted to transmit from lever to arm a force observable on the indicator.

3. A brake testing device for vehicle wheels comprising an arm, a part of said arm being adapted to engage the shaft or hub of the wheel so as to fix said arm at a definite radial position on the wheel, a gripping member pivotally connected to the arm and comprising a tubular section pivoted to the arm, a second section socketed in said tubular section and provided with a grapple, means on said tubular section for locking said sections against relative longitudinal movement, a hand lever also pivotally connected to the arm, and a force indicator operatively connecting the arm and the lever and adapted to transmit from lever to arm a force observable on the indicator.

4. A brake testing device for vehicle wheels comprising an arm, a part of said arm being adapted to engage the shaft or hub of the wheel so as to fix said arm at a definite radial position on the wheel, a gripping member pivotally connected to the arm, means for varying the distance between the pivotal connection of the gripping member to the arm and the end of the arm adapted to engage a wheel-hub, a hand lever also pivotally connected to the arm, and a force indicator operatively connecting the arm and the lever and adapted to transmit from lever to arm a force observable on the indicator.

5. A brake testing device for vehicle wheels comprising an arm, a part of said arm being adapted to engage the shaft or hub of the wheel so as to fix said arm at a definite radial position on the wheel, a gripping member pivotally connected to the arm and comprising two elongated parts rotatably movable but longitudinally immovable relatively to one another, means for varying the distance between the pivotal connection of the gripping member to the arm and the end of the arm adapted to engage a wheel-hub, a hand lever also pivotally connected to the arm, and a force indicator operatively connecting the arm and the lever and adapted to transmit from lever to arm a force observable on the indicator.

6. A brake testing device for vehicle wheels comprising an arm, a part of said arm being adapted to engage the shaft or hub of the wheel so as to fix said arm at a definite radial position on the wheel, a gripping member pivotally connected to the arm and comprising telescopically jointed elongated sections rotatably movable but longitudinally immovable relatively to one another, means for varying the distance between the pivotal connection of the gripping member to the arm and the end of the arm adapted to engage a wheel-hub, a hand lever also pivotally connected to the arm, and a force indicator operatively connecting the arm and the lever and adapted to transmit from lever to arm a force observable on the indicator.

7. A brake testing device for vehicle wheels comprising an arm, a part of said arm being adapted to engage the shaft or hub of the wheel, so as to fix said arm at a definite radial position on the wheel, a gripping member pivotally connected to the arm and comprising a tubular section pivoted to the arm, a second section socketed in said tubular section and provided with a grapple, means on said tubular section for locking said sections against relative longitudinal movement, means for varying the distance between the pivotal connection of the gripping member to the arm and the end of the arm adapted to engage a wheel-hub, a hand lever also pivotally connected to the arm, and a force indicator operatively connecting the arm and the lever and adapted to transmit from lever to arm a force observable on the indicator.

In testimony whereof I have signed my name unto this specification.

ALBERT HOVDE.